United States Patent [19]
Lin

[11] Patent Number: 6,163,314
[45] Date of Patent: Dec. 19, 2000

[54] MULTI-SYNC MONITOR POWER SUPPLY SYSTEM WITH HARMONIC ELIMINATING MEANS

[75] Inventor: Yi-Jen Lin, Taipei, Taiwan

[73] Assignee: Tatung Co., Ltd., Taipei, Taiwan

[21] Appl. No.: 09/095,885

[22] Filed: Jun. 11, 1998

[51] Int. Cl.[7] .............................. G09G 5/00; H02M 1/10
[52] U.S. Cl. ........................................ 345/211; 363/142
[58] Field of Search .................................. 348/372, 730; 363/142, 143; 307/130, 125; 345/211, 212

[56] References Cited

U.S. PATENT DOCUMENTS

| | | | |
|---|---|---|---|
| 4,608,498 | 8/1986 | Falzarano et al. | 307/22 |
| 4,843,301 | 6/1989 | Belanger | 323/224 |
| 5,001,623 | 3/1991 | Magid | 363/143 |
| 5,331,532 | 7/1994 | Iwai et al. | 363/20 |
| 5,406,308 | 4/1995 | Shiki | 345/127 |
| 5,961,648 | 10/1999 | Choi et al. | 713/323 |

*Primary Examiner*—Lun-Yi Lao
*Attorney, Agent, or Firm*—Bacon & Thomas, PLLC

[57] ABSTRACT

A computer monitor power supply system includes a comparator, a relay, and an inductor connected in series between the AC input and a flyback transformer circuit. The inductor includes two windings which are automatically switched between a parallel connection and a series connection upon switching between a 110 V and 220 V power input so as to reduce the amount of low frequency harmonics.

1 Claim, 14 Drawing Sheets

Factory   Business Building   Residence

MULTI-SYNC MONITOR POWER SUPPLY SYSTEM WITH HARMONIC ELIMINATING MEANS

BACKGROUND OF THE INVENTION

The present invention relates to a power supply system for a computer monitor, and more particularly to a power supply system for both 110 V and 220 V AC sources which eliminates harmonics efficiently.

Figure 1:
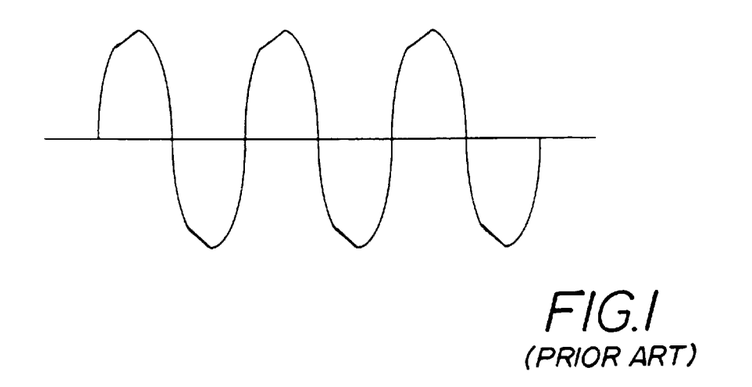
FIG. 1 illustrates a distorted waveform of a city power voltage.

The ideal AC source voltage waveform is a pure 60 Hz sine wave. If a sine wave has a distortion (as shown in FIG. 1), it indicates the presence of a harmonic. The harmonic can be 120 Hz, 180 Hz, 240 Hz, . . . , that is, beyond the 60 Hz fundamental frequency.

Figure 2A:
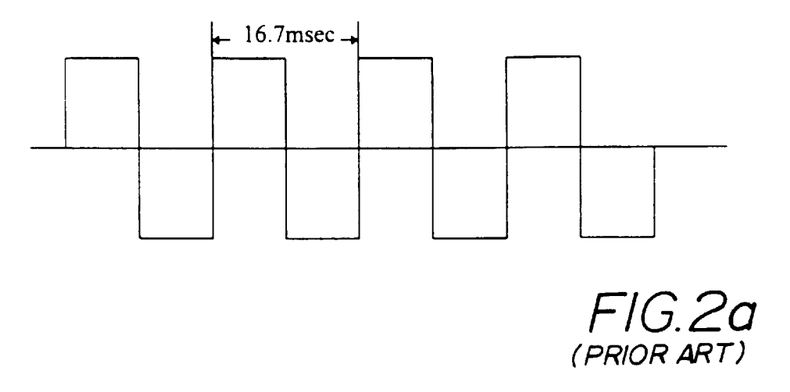
FIG. 2a illustrates the waveform. of a 60 Hz square wave.
Figure 2B:
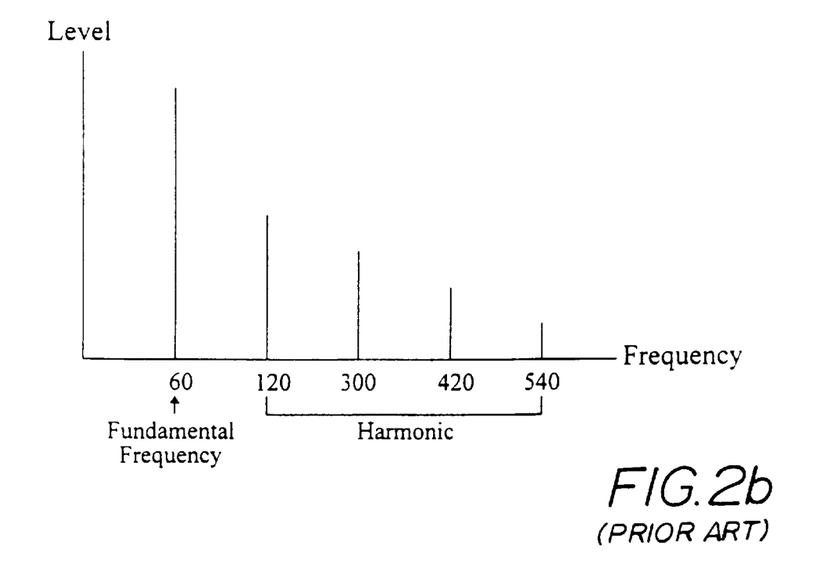
FIG. 2b is a spectral analysis waveform chart obtained from the 60 Hz square wave.
Figure 3:
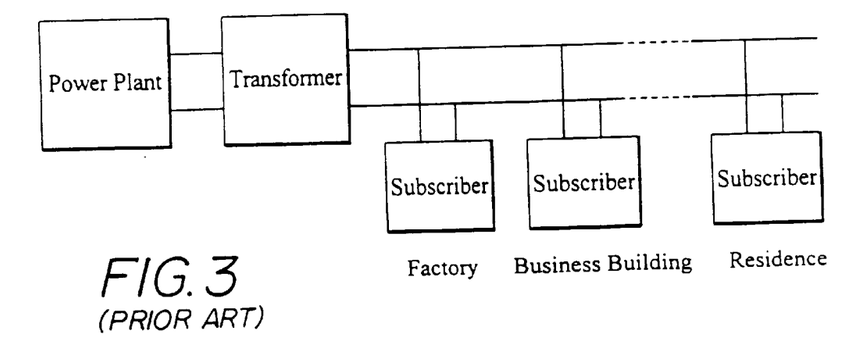
FIG. 3 illustrates the distribution of a power supply to subscribers.

When the 60 Hz square wave shown in FIG. 2a is analyzed by Fourier Series, the waveform shown in FIG. 2b results. FIGS. 4a to 4d show the input characteristics of a computer monitor power supply circuit in which the electric current waveform (see FIG. 4d) greatly differs from the sine wave, indicating the presence of significant harmonic current. Except for resistance type electrical heating apparatus, the input current of most electronic apparatus, and particularly ones using a switching power supply or phase control, carries surges. If the use of these electrical apparatus reaches a certain amount, as shown in FIG. 3, the harmonic current malfunctions shown in the following Table I will occur in the whole power supply system when the total load current of the end users contains a certain amount of harmonics.

TABLE I

| Interfered Apparatus | | Malfunction Phenomenon |
| --- | --- | --- |
| Power System | Series reactance | burnout overheat, vibration, noise due to overcurrent |
| | Fuse | broken |
| Motor circuit breaker | | melted due to overcurrent false action |
| Electric home appliance | Audio equipment | noise |
| | Television set | picture jumping |
| Others | Motor | noise, vibration |
| | Elevator | vibration, shut down |
| | Control Circuit | false action |
| | Harmonic filter | trip off due to overcurrent |

Therefore, the IEC issued standard number IEC-1000-3-2 in 1993 to define harmonic current levels in public low voltage power supply systems. Monitors are classified as D type electric appliances, and the harmonic current of monitors is defined as shown in the following Table II..

TABLE II

| Oder of harmonic (n) | Maximum allowable harmonic current per Watt (mA/W) | Maximum allowable harmonic current (A) |
| --- | --- | --- |
| 3 | 3.4 | 2.30 |
| 5 | 1.9 | 1.14 |
| 7 | 1.0 | 0.77 |
| 9 | 0.5 | 0.40 |
| 11 | 0.35 | 0.33 |
| 13 ≦ n ≦ 39 | 3.85/n | 0.15 × 15/n |
| (odd oder harmonic effective) | | |

Figure 4A:
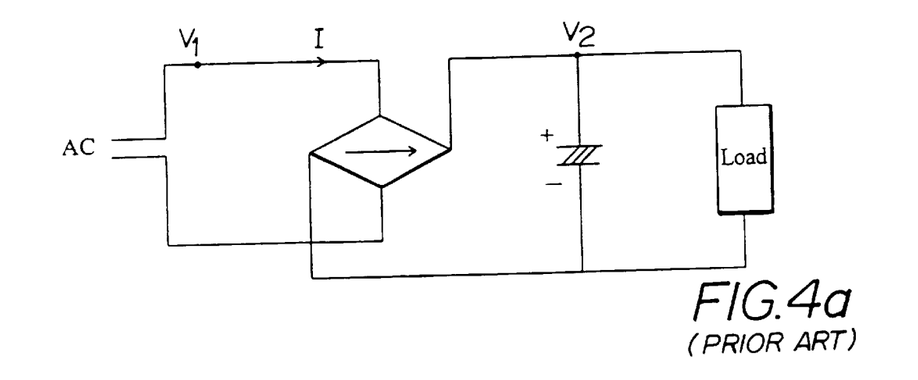
FIGS. 4a to 4d illustrate the input characteristics of a conventional monitor power supply circuit.
Figure 4B:
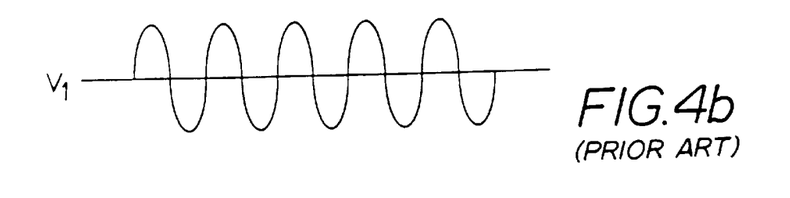
Figure 4C:
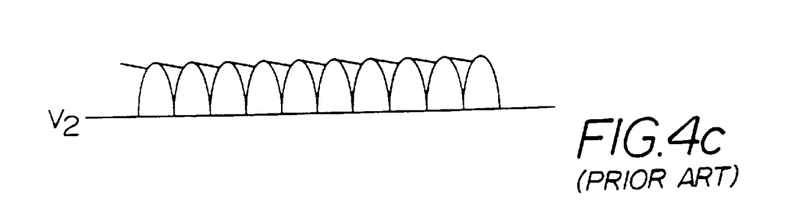
Figure 4D:
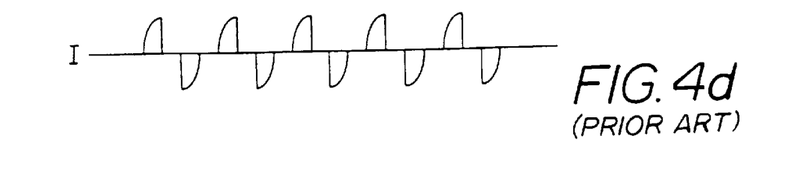

In the conventional monitor power supply circuit shown in FIG. 4a, the load of the monitor must be capacitive because the rectified output is directly connected to the filter capacitor, and therefore an inductor is needed for neutralization to make the load close to pure resistance, so as to reduce harmonic current. The methods shown in the following Table III are commonly adopted.

TABLE III

Figure 5A:
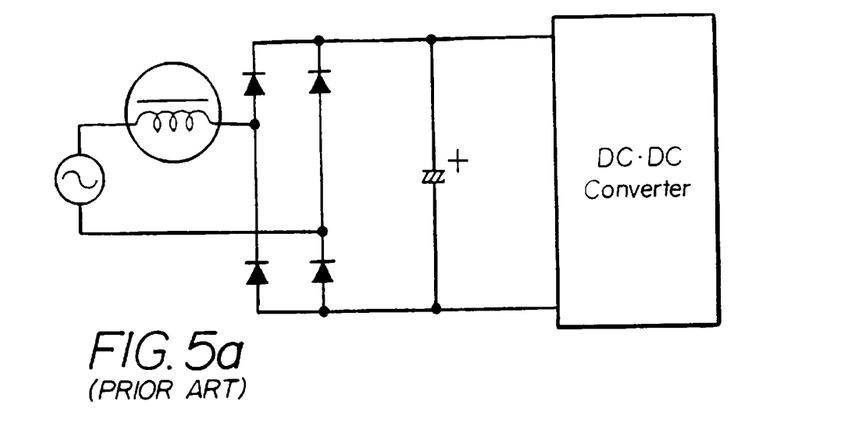
FIG 5a is a circuit diagram of a harmonic current eliminating circuit constructed according to the first prior art method (series inductor type).
Figure 5B:
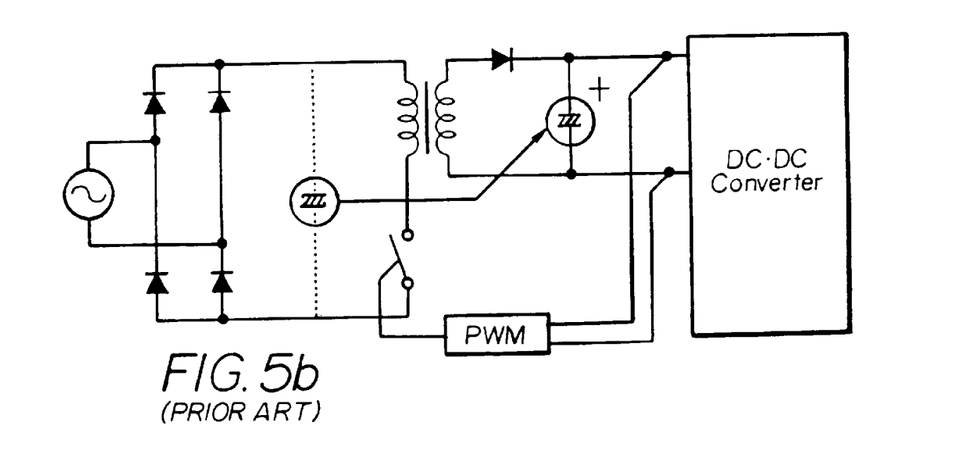
FIG. 5b is a circuit diagram of a harmonic current eliminating circuit constructed according to the second prior art method (converter type).
Figure 5C:
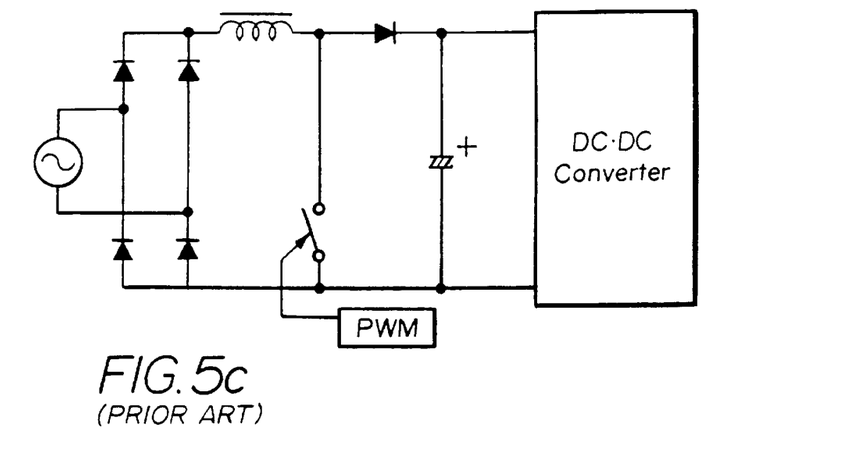
FIG. 5c is a circuit diagram of a harmonic current eliminating circuit constructed according to the third prior art method (active filter type).

| Method Item | 1. Series Inductor | 2. Converter | 3. Active Filter |
| --- | --- | --- | --- |
| harmonic improvement | barely acceptable | good | excellent |
| Cost | low | 2.5 times above method 1 | 3.5 times above method 1 |
| Efficiency | 90 ~ 95% | 80 ~ 85% | 80 ~ 85% |
| Power Factor | 0.65 ~ 0.75 | 0.8 ~ 0.9 | 0.9 ~ 0.99 |
| Interference prevention | not needed | difficult to overcome | difficult to overcome |
| 88 V ~ 264 V input | not allowed | barely allowed | allowed |
| Control circuit | FIG. 5a | FIG. 5b | FIG. 5c |

The aforesaid second method and third method have the drawbacks of high cost and serious electromagnetic interference, and therefore they are not popularly accepted.

The aforesaid first method costs less, but is not suitable for a power range of from 110 V grade (110 V±20%) to 220 V grade (220 V±20%), and therefore the inductor used in a monitor to eliminate harmonics must be relatively changed subject to local power voltage. This limitation causes a great trouble to manufacturers and distributors. In order to facilitate the manufacturing process and sales management and to prevent a wrong use, a harmonic eliminating device should be applicable to both 110 V grade and 220 V grade power supplies, i.e., applicable to the currents ranging from range within AC 80 V~AC 264 V.

SUMMARY OF THE INVENTION

The present invention has been accomplished with the above-described circumstances in view. It is the main object of the present invention to provide a power supply circuit for a computer monitor which is applicable to both 110 V and 220 V currents, and which effectively eliminates harmonics.

According to the present invention, the inductor unit is made having two independent windings of same design, and the iron core is shaped like "Λ".

Figure 6A:
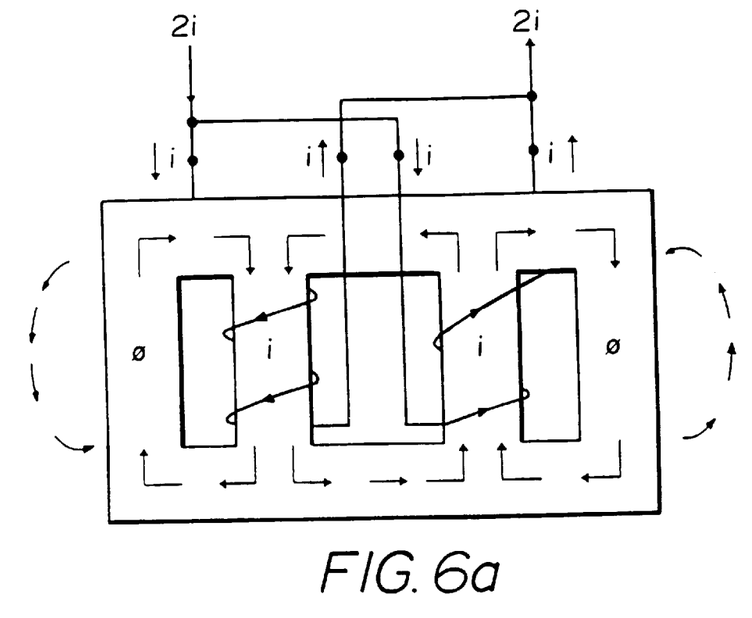
FIG. 6a is a current, magnetic flux distribution chart showing the inductors connected in parallel for a 110 V AC source.
Figure 6B:
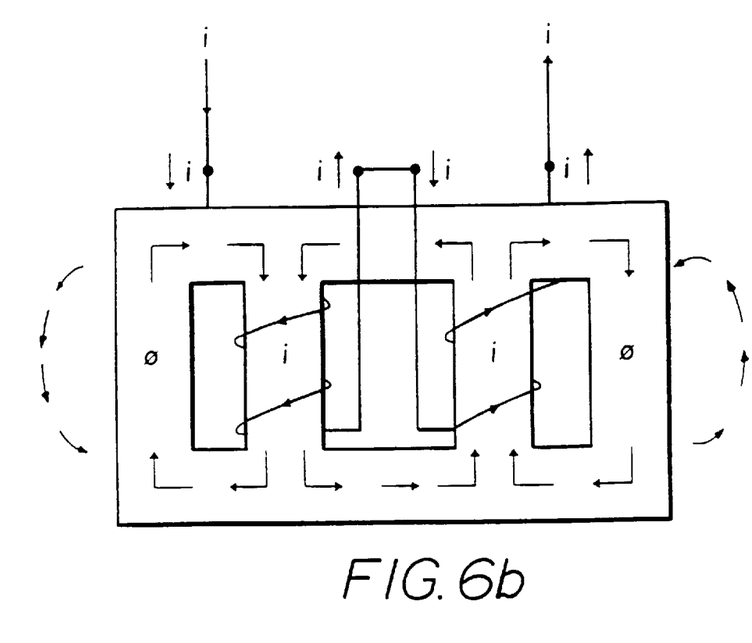
FIG. 6b is a current, magnetic flux distribution chart showing the inductors connected in series for a 220 V AC source.
Figure 7A:
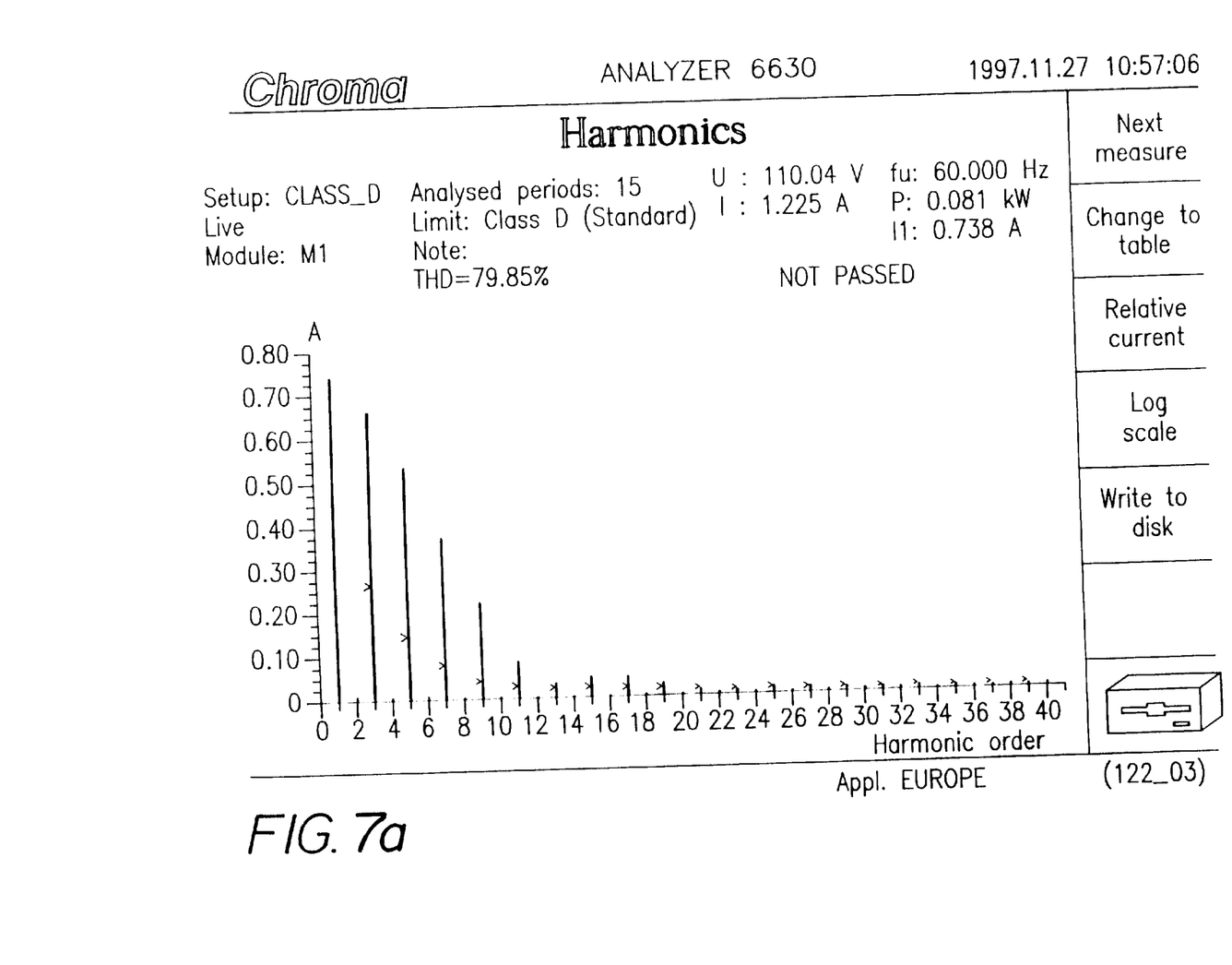
FIG. 7a is a harmonic value chart measured from a monitor at AC 110 V
Figure 7B:
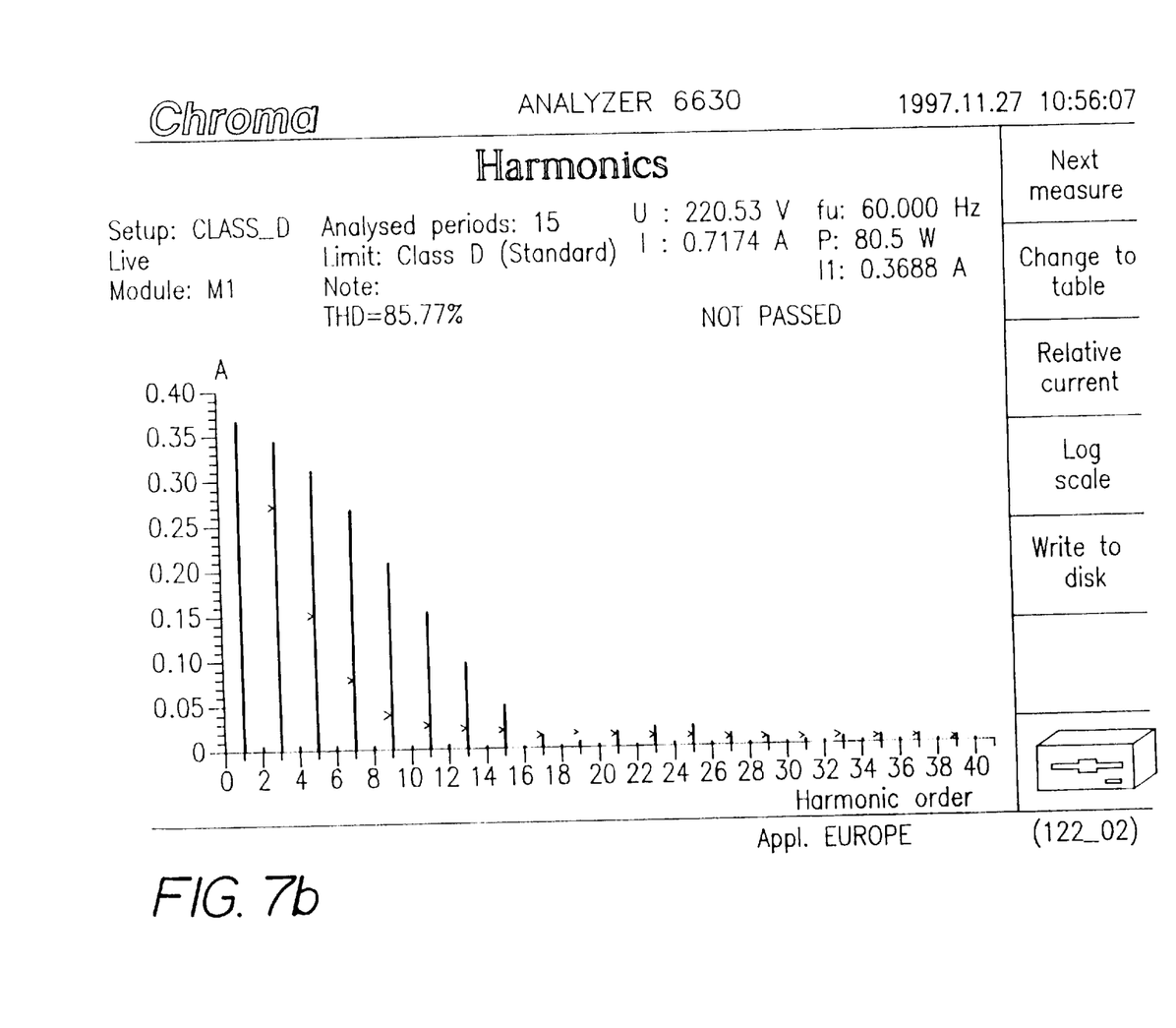
FIG. 7b is a harmonic value chart measured from a monitor at AC 220 V.
Figure 8A:
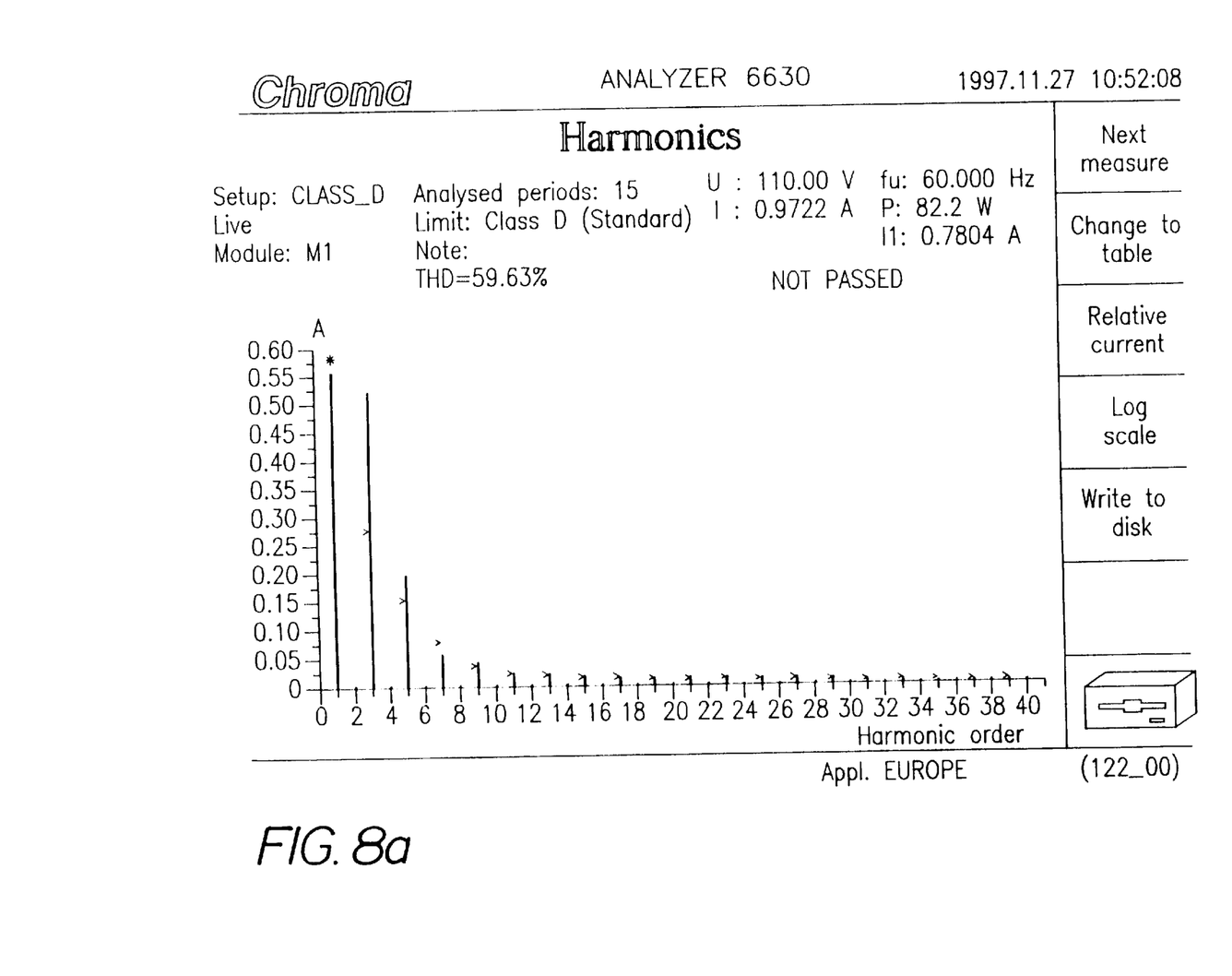
FIG. 8a is a harmonic value chart measured from a computer monitor with the present invention at AC 110 V.
Figure 8B:
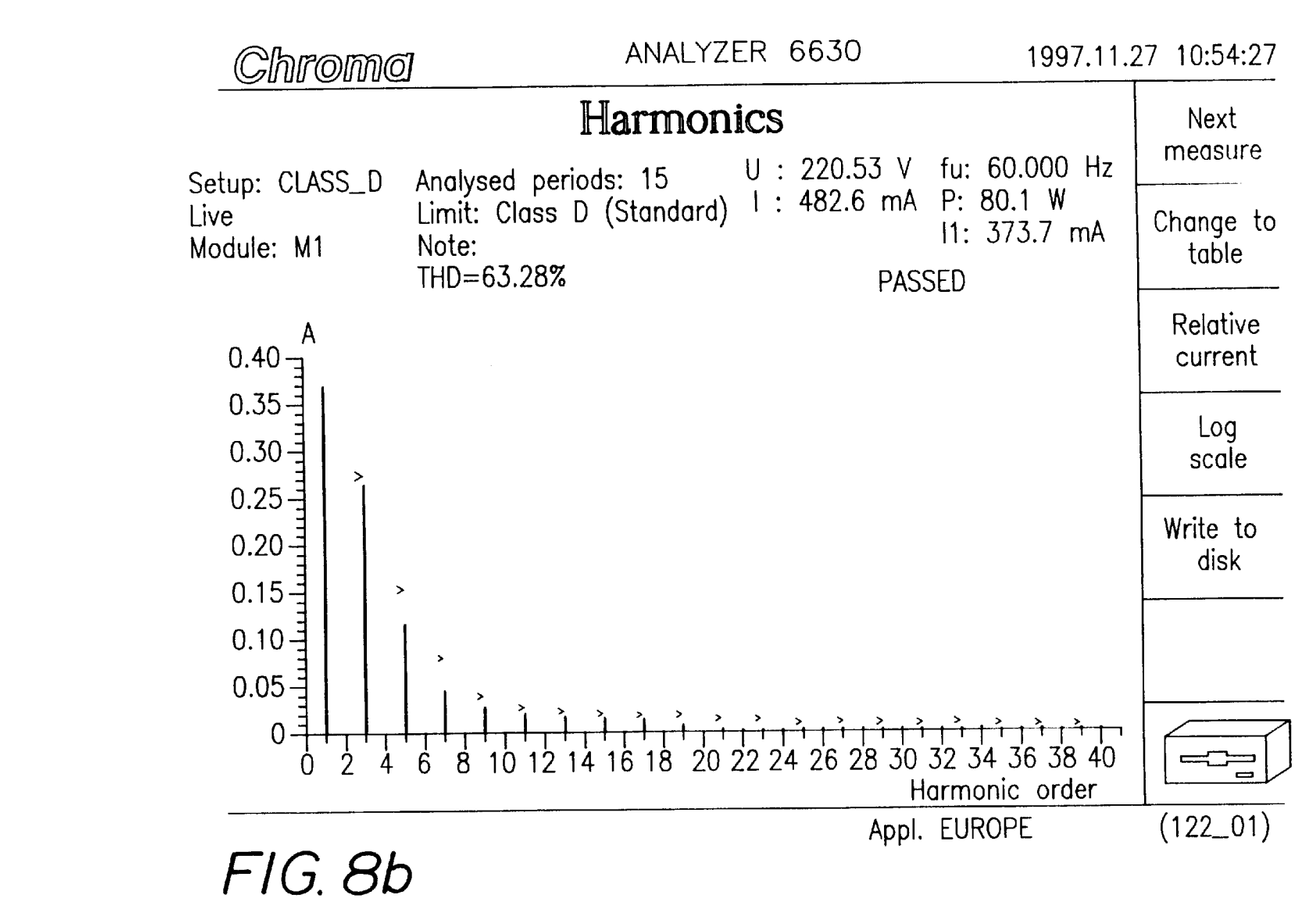
FIG. 8b is a harmonic value chart measured from a computer monitor with the present invention at AC 220 V.

When the power voltage input is 110 V grade, the two windings are connected in parallel as shown in FIG. 6a. When power voltage input is 220 V grade, the two windings are connected in series as shown in FIG. 6b. Either in parallel connection or series connection (the current output of the former is 2i, and the latter is i), the distribution and direction of current i of the windings are the same, i.e., the distribution and direction of the magnetic flux Φ within the iron cores are the same, and therefore the present invention is practical. In other words, when the power supply voltage of the monitor is at 110 V grade, the inductors are connected in parallel to reduce harmonic current from the monitor. When the power supply voltage of the monitor is at 220 V grade, the inductors are connected in series, and harmonic current from the monitor can also be reduced. Because the power supply circuit of a monitor uses the switching power supply circuit, doubling the source voltage cannot reduce the load current to one half, or reduce harmonic current proportionally. For example, FIG. 7a shows the harmonic current value measured from the monitor at AC 110 V, and FIG. 7b shows the harmonic current value measured from the monitor at AC 220 V. The former is 1.225 A, and the latter is 0.7174 A (not one half of the former). Further, different order harmonic currents do not change in the same ratio. Assume the monitor uses a power supply circuit constructed according to the present invention, the inductance for parallel connection is Lp=12 mH, and the inductance for series connection is Ls=48 mH, so that the value measured at AC 110 V is as shown in FIG. 8a, and the value measured at AC 220 V is as shown in FIG. 8b. It is apparent that FIG. 8b passes the limited values shown in Table II, but FIG. 8a does not pass. Therefore, the inductance of the inductors must be increased to such a level that the value measured at AC 110 V passes the limited values. At this stage the value of Ls surpasses 48 mH, so of course the value measured at AC 220 V also undoubtedly meets the requirement.

DETAILED DESCRIPTION OF THE PREFERRED EMBODIMENTS

Figure 9:
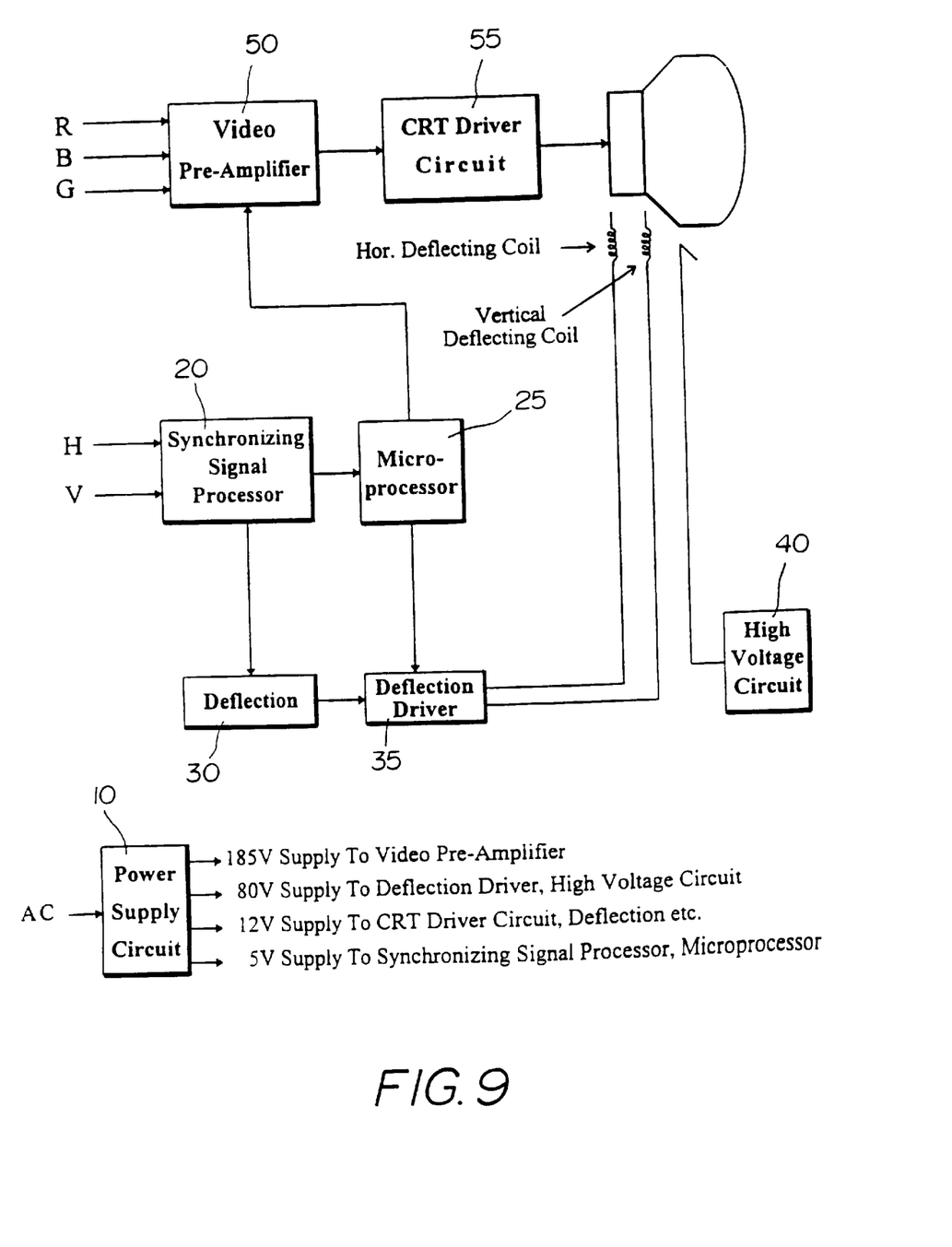
FIG. 9 is a circuit block diagram of a computer monitor.

Referring to FIG. 9, a computer monitor generally comprises a power supply circuit 10, a synchronizing signal processor 20, a microprocessor 25, a deflection 30, a deflection driver 35, a high voltage circuit 40, a video pre-amplifier 50, and a CRT driver circuit 55. The main point of the present invention is the controlling operation of the power supply circuit 10. In this example, the power supply circuit 10 is a flyback type of power supply circuit. The synchronizing signal processor 20, the microprocessor 25, the deflection 30, the deflection driver 35, the high voltage circuit 40, the video pre-amplifier 50 and the CRT driver circuit 55 are known parts and not within the scope of the invention, and therefore they are not described in detail.

The operation principle of the power supply circuit 10 is outlined hereinafter.

Figure 10:
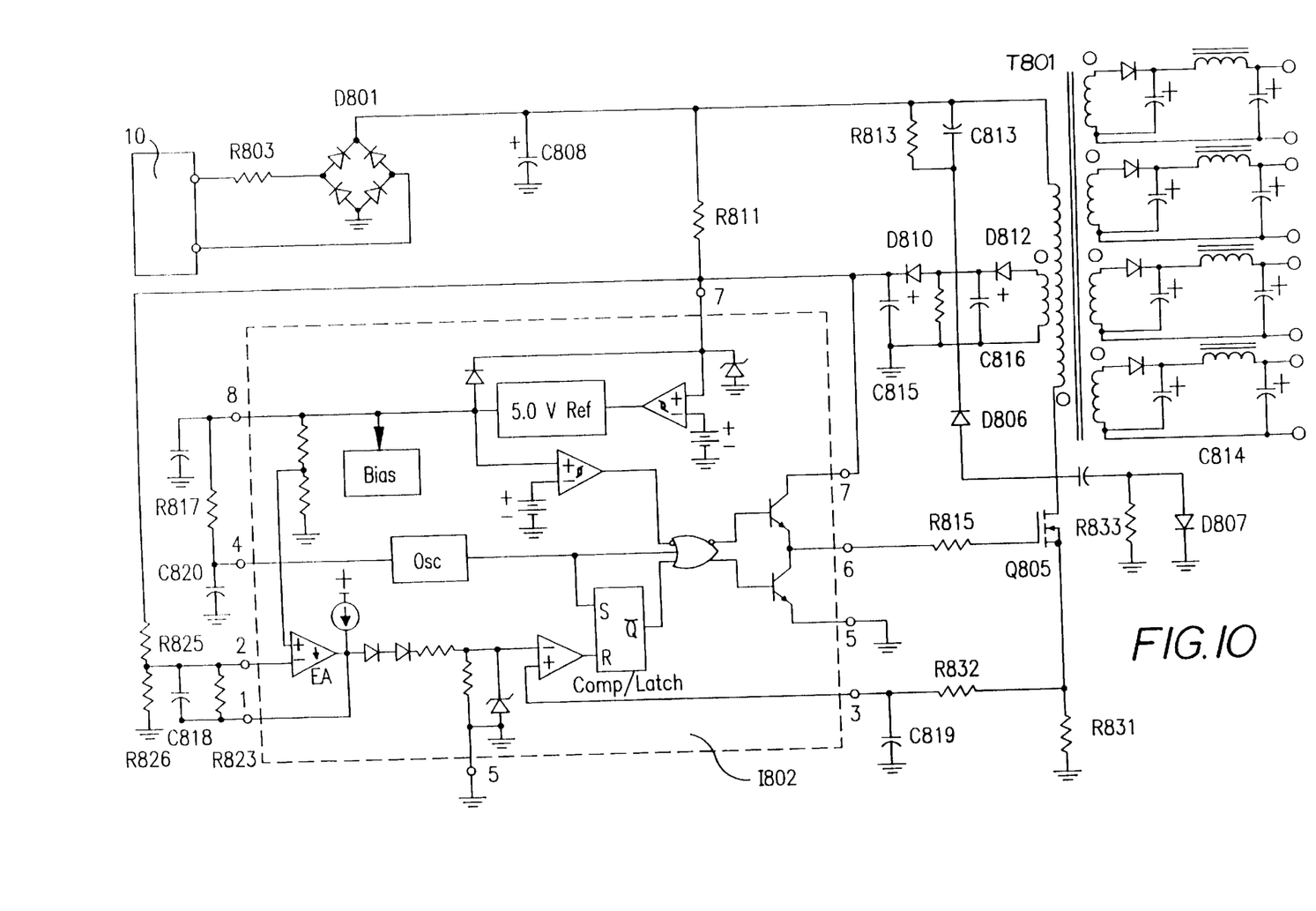
FIG. 10 is a circuit diagram of an integrated circuit UC3842A used in a computer monitor power supply circuit.
Figure 11A:
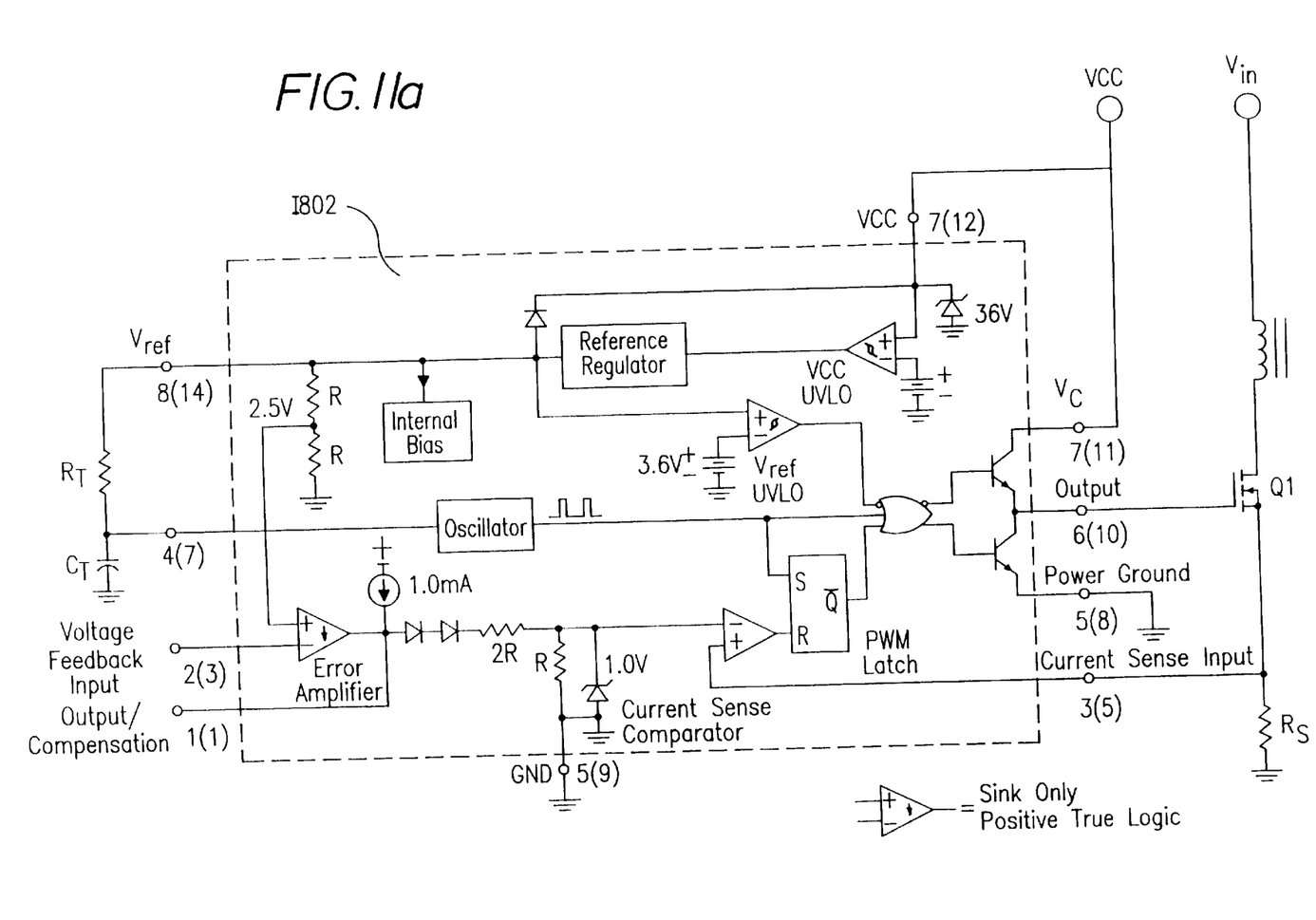
FIG. 11a illustrates the structure and application example of the integrated circuit UC3842A.
Figure 11B:
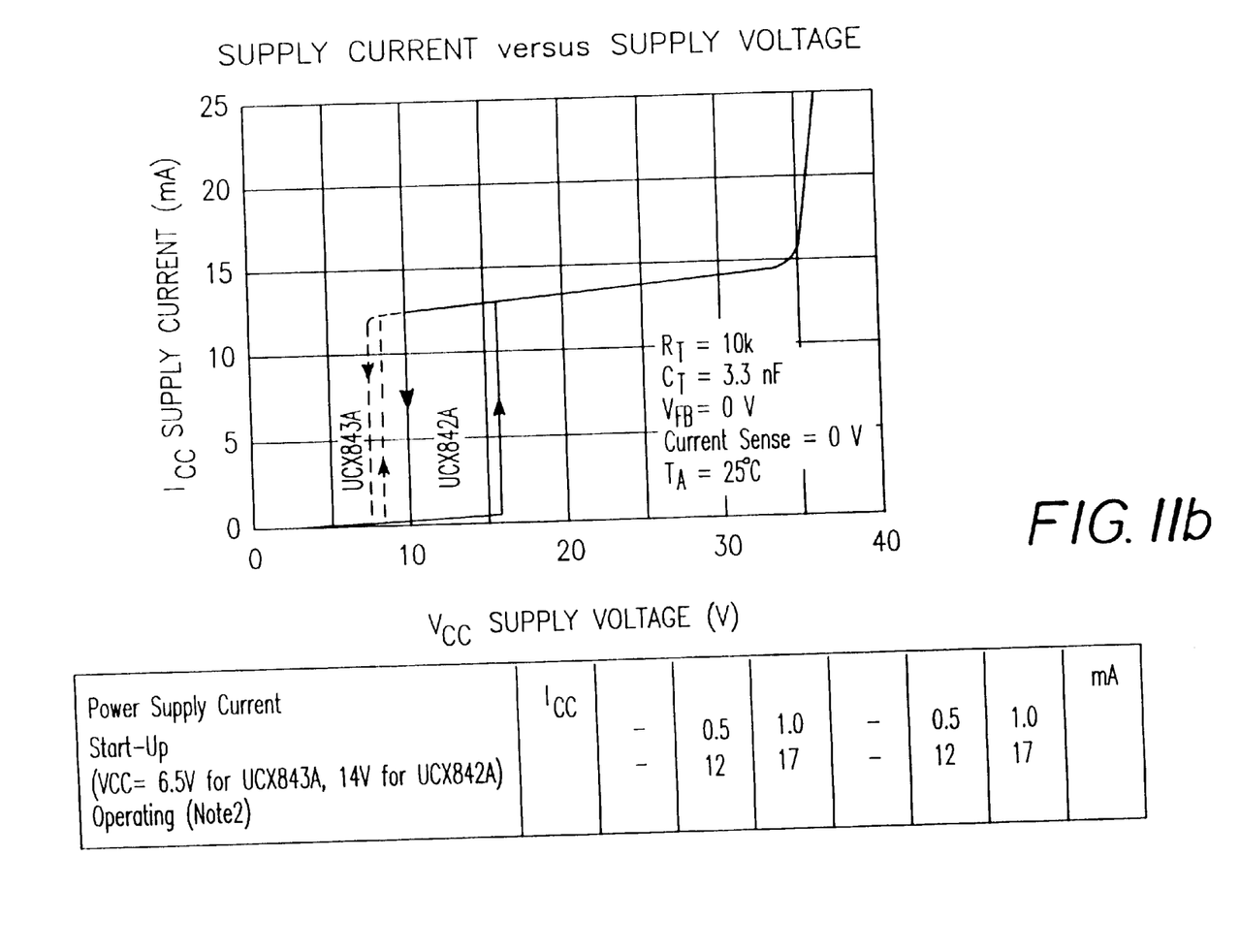
FIG. 11b is a supply current versus supply voltage operating curve obtained from the integrated circuit UC3842A.

(1) As illustrated in FIG. 10, the IC UC3842A $I_{802}$, used in the power supply circuit 10, is a high performance current mode controller. The internal structure of the IC UC3842A $I_{802}$ is shown in FIG. 11a.

Figure 12A:
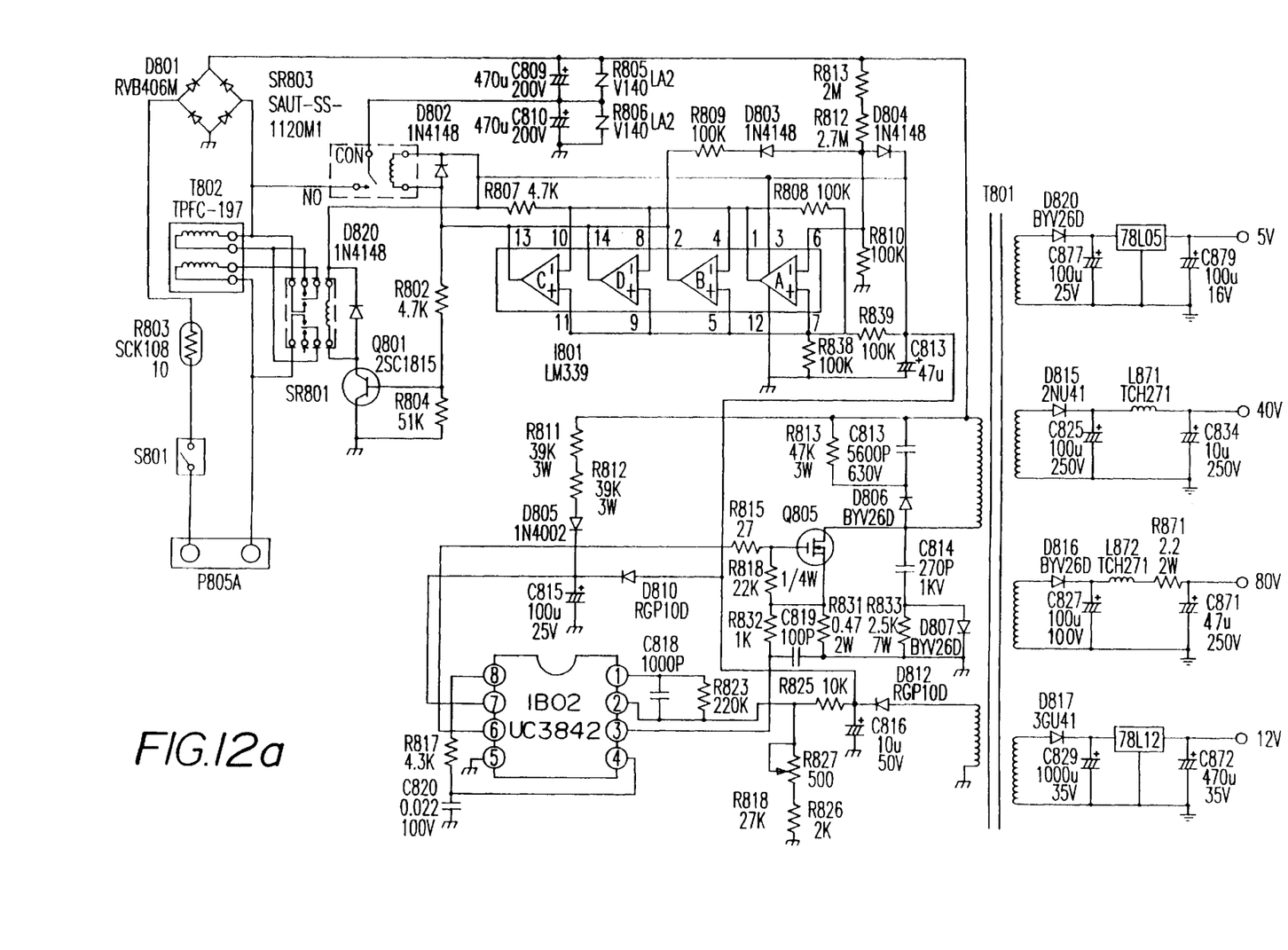
FIG. 12a is a circuit diagram of the first embodiment according to the present invention (with a voltage-doubler rectified circuit at 110 V AC input).
Figure 12B:
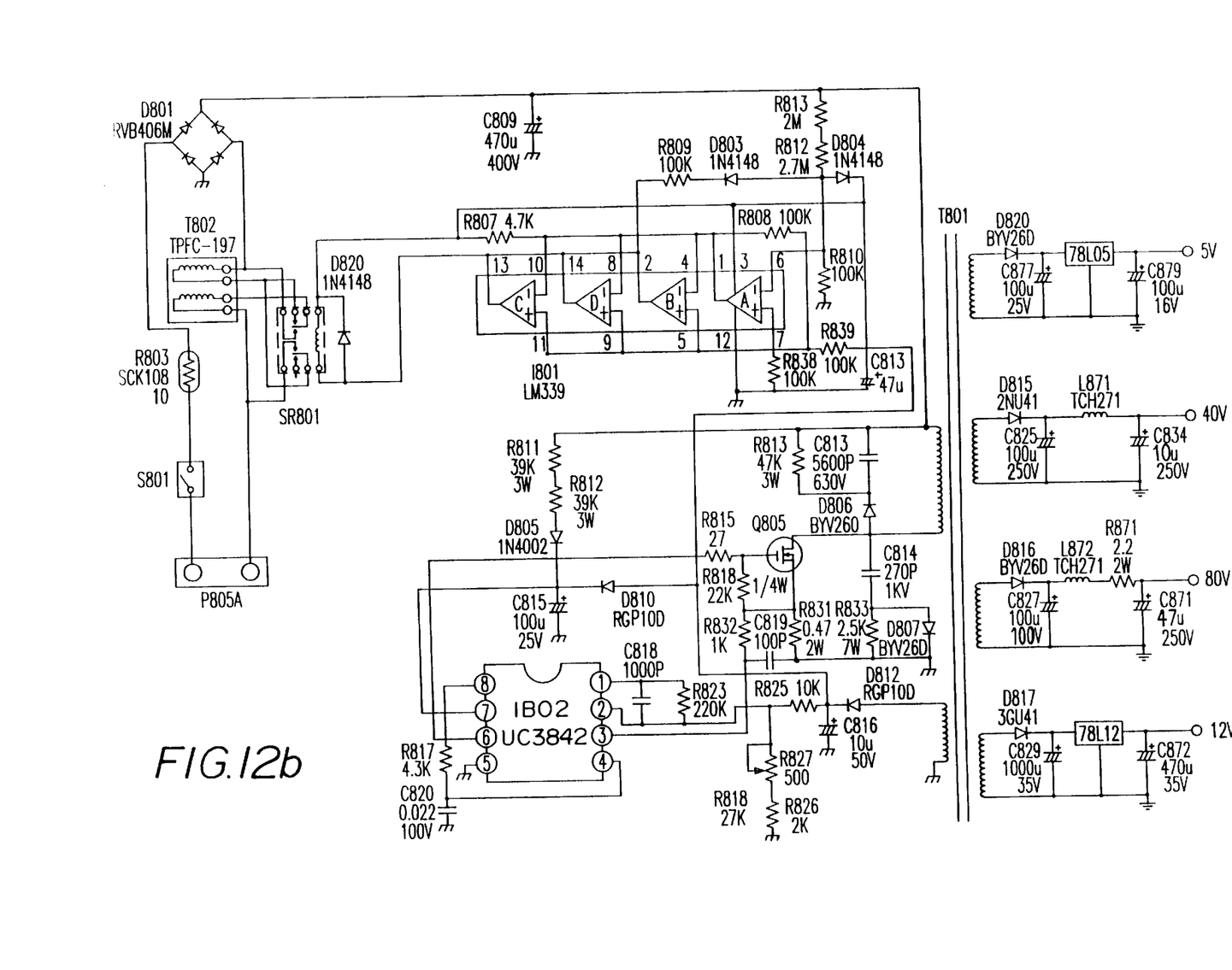
FIG. 12b is a circuit diagram of the second embodiment of the present invention (with a voltage-doubler rectified circuit at 110 V AC input).

(2) Rectifier circuit:
Referring also to FIG. 12b, AC current is sent through resistor $R_{803}$ to diode $D_{801}$ for rectification, and then filtered through capacitor $C_{805}$, and then sent to a starting circuit and a driving circuit.

(3) Starting Circuit:

Electric current is sent through resistor $R_{811}$, resistor $R_{812}$ and diode $D_{805}$ to charge capacitor $C_{815}$ to 16 V. Because $C_{815}$ is connected to the $7^{th}$ pin of IC UC3842A $I_{802}$, IC UC3842A $I_{8021}$ is started when capacitor $C_{815}$ is charged to 16 V, and a PWM (pulse width modulation) signal is sent out through the $6^{th}$ pin. The start current and working current of IC UC3842A $I_{802}$ are smaller than 1 mA and 17 mA respectively. Referring to FIG. 7b, after IC UC3842A $I_{802}$ has been started the working current is greater than the charging current through $R_{811} \rightarrow R_{812}$, and IC UC3842A $I_{802}$ will shut down if the end voltage of capacitor $C_{815}$ drops below 10 V and current compensation is not obtained from diode $D_{810}$.

(4) Driving circuit:

When the $6^{th}$ pin of IC UC3842A $I_{802}$ outputs a pulse through transistor $R_{815}$ to transistor $Q_{805}$, transistor $Q_{805}$ is turned on if the pulse is at high potential, or turned off if at low potential. When transistor $Q_{805}$ is on, current i goes through $C_{809} \rightarrow T_{801} \rightarrow Q_{805} \rightarrow R_{831} \rightarrow C_{809}$. At this moment, ½ $Li^2$ energy will be stored in the ferrite core of transformer $T_{801}$ via the primary inductance L. After that, the transistor is off, and the magnetic energy ½ $Li^2$ will be transferred to electrical energy and released from the secondary windings of $T_{801}$ to generate several DC voltage outputs.

(5) Voltage feedback:

Voltage generated from the feedback winding at the secondary end of transformer $T_{801}$ is rectified by diode $D_{812}$, then filtered by capacitor $C_{816}$, then sent through diode $D_{810}$ to charge capacitor $C_{815}$ (please refer to the explanation on the aforesaid "starting circuit"), causing capacitor $C_{815}$ to be maintained within 10 V~35 V (for example, 12 V) for the working of IC UC3842A $I_{802}$. Voltage from capacitor $C_{815}$ is connected to resistor $R_{825}$ and a voltage divider circuit formed of resistor $R_{827}$ and resistor $R_{826}$, and then connected to the second pin of IC UC3842A $I_{802}$. When the voltage obtained from the voltage divider surpasses 2.5 V, the $6^{th}$ pin of IC UC3842A $I_{802}$ stops outputting, so that output voltage is maintained at a constant value.

(6) Current-limiting protection:

In order to prevent an overcurrent during working of transistor $Q_{805}$, resistor $R_{831}$ is connected in series to the source pin of transistor $Q_{805}$ to limit the voltage drop of $Is \times R_{831}$ to below 1 V (wherein current Is is the source current of transistor $Q_{805}$). If the voltage drop surpasses 1 V, the 3rd pin of IC UC3842A $I_{802}$ detects an overload, causing IC UC3842A $I_{802}$ to shut down.

(7) Frequency control:

When IC UC3842A $I_{802}$ is working, its $8^{th}$ pin provides a 5 V reference voltage to make the oscillator circuit of resistor $R_{817}$ and capacitor $C_{820}$ work. The oscillation frequency is determined by resistor $R_{817}$ and capacitor $C_{820}$. When resistor $R_{817}$=4.3 K and capacitor $C_{820}$=0.022 µF, the frequency is about 20 KHz (see specification manual of IC UC3842A $I_{802}$).

(8) Error compensation:

IC UC3842A $I_{802}$ comprises an internal amplifier. The gain of the internal amplifier of IC UC3842A $I_{802}$ is controlled by resistor $R_{823}$, and its response speed is controlled by capacitor $C_{818}$. The voltage feedback value at the second pin of IC UC3842A $I_{802}$ is 2.5 V±Δv, where Δv=error value. The value of Δv is directly proportional to the output voltage error at each output end of the transformer $T_{801}$, i.e., the greater the value of Δv (error value), the higher the output voltage error will be. In contrast, when the error value is reduced, the working frequency of IC UC3842A $I_{802}$ is increased, causing transistor $Q_{805}$ to increase its loss and temperature. The output voltage error is proportional to resistor $1/R_{823}$ and capacitor $C_{818}$.

(9) Induction voltage elimination:

Because transformer $T_{801}$ is an inductive load, when transistor $Q_{805}$ is changed from the "On" state to an "Off" state, a reverse electromotive force is produced at the primary end of transformer $T_{801}$. The electromotive force is provided by the induced voltage of $L \times (di/dt)$, in which L is inductance of the primary wiring of transformer $T_{801}$; I=conduction current at transistor $Q_{805}$; and t=fall time of transistor $Q_{805}$. The induced voltage is as high as several thousand volts, which surpasses the breakdown voltage of transistor $Q_{805}$. In order to protect transistor $Q_{805}$, snubbers are provided to absorb the energy of $L \times (di/dt)$, enabling it to be reduced to within the rating voltage of transistor $Q_{805}$. Capacitor $C_{814}$, resistor $R_{853}$ and diode $D_{807}$ form one circuit to absorb the energy, capacitor $C_{813}$, resistor $R_{813}$ and diode $D_{806}$ form the other.

The present invention uses a comparator to detect the voltage value of the power supply, and to output the detected result to drive relay $SR_{801}$, causing it to change the windings of inductor $T_{802}$ to a series connection or parallel connection. When power consumption is over 100 W, a voltage doubler rectifier circuit is used for AC 110 V power input, and a bridge rectifier circuit is used for AC 220 V power input (see FIG. 12a). For cost's sake, when power consumption is below 100 W, a bridge rectifier circuit without a voltage doubler is used (see FIG. 12b). The bridge rectifier circuit with voltage doubler function and the bridge rectifier circuit without voltage doubler function work in the same manner, and the only difference between these two types of bridge rectifier circuits is the "voltage detection" that must be used. The operation of the "voltage detection" is described hereinafter by way of example with reference to FIG. 12a.

According to the present example, IC $I_{801}$, uses LM339 which has four comparators A;B;C;D, and whose output port is an open collector type. Comparators B;C and comparator D are connected in parallel to increase the sink current at the output port, so as to facilitate the driving of relay $SR_{803}$. Therefore, comparators B;C;D are regarded as a single comparator BCD. Further, $V_1$ is assigned to the voltage at the first pin of IC $I_{801}$, $V_2$ is assigned to the voltage at the second pin of IC $I_{801}$, and so on.

(a) Initial state of power voltage input:

When power is input through P805A, electric current passes through bridge rectifier $D_{801}$, resistor $R_{811}$, resistor $R_{812}$ and diode $D_{805}$, if power switch $S_{801}$ is closed, so as to charge capacitor $C_{815}$. When the end voltage of capacitor $C_{815}$ reaches 16 V, IC $I_{802}$ is started, and feedback voltage from the secondary end of transformer $T_{801}$ is sent through diode $D_{812}$ to charge capacitor $C_{815}$ to, for example, 12.5 V. When capacitor $C_{815}$ is initially charged, the $6^{th}$ pin of IC $I_{801}$ has a voltage, but the $3^{rd}$ pin (Vcc) has no voltage. In order to prevent a damage due to a higher voltage at the input port than at the power supply, diode $D_{804}$ is connected to a Vcc clamp for protection. When comparator A is in the initial state, $V_1=0$ V because $V_6>V_7$; when capacitor $C_{816}$ is fully charged to 12.5 V, $V_5=V_7$ and $V_7>0$ V because $V_4=V_1=0$ V, and the output of comparator BCD is 12.5 V. Therefore, relay $SR_{803}$ does no work, and transistor $Q_{801}$ is turned on to energize the coil of relay $SR_{801}$. Because the operation time from the state where the coil of relay $SR_{801}$ is initially energized to the state where the contacts are closed is normally over 10 ms and the operation time of IC $I_{801}$ is several $\mu s$, the power supply voltage input becomes stable before the contacts of relay $SR_{801}$ are closed, as described in (b).

(b) Power supply voltage input is stable:

Resistor $R_{808}$ is the positive feedback resistor of comparator A that achieves a hysteresis comparison effect. When at the initial stage, $V1=0$ V, one end of resistor $R_{808}$ is grounded, causing resistor $R_{808}$ and resistor $R_{838}$ to be connected in parallel (indicated by $R_{808}//R_{838}$), i.e., $$V_7 = 12.5V \times \frac{R_{808} // R_{838}}{R_{808} // R_{838} + R_{839}}$$

as shown in FIG. 12a, because $R_{808}=R_{838}=R_{839}=100$ K, and thus, $V_7=4.17$ V.

$$V_6 = \sqrt{2} \times V_{AC} \times \frac{R_{810}}{R_{810} + R_{812} + R_{813}}$$

as shown in FIG. 12a, because $R_{810}=100$ K, $R_{812}=2.7$ M, and $R_{813}=2$ M, if (I) $V_{AC}=110$ V, resulting in $V_6=3.24\pm0.6.5$ V=3.89 V~2.49 V; in which case $V_6<V_7$, causing $V_1=12.5$ V. At this time, resistor $R_{808}$ and resistor $R_{807}$ are connected in series to Vcc, and resistor $R_{839}$ is in parallel connection with $R_{808}+R_{807}$ to increase $V_7$ to 8.34 V, so as to achieve hysteresis (refer to explanation (c)). At the same time, $V_4$ of comparator BCD=$V_1$=12.5 V, $V_5=V_7=8.34$ V, so that $V_4>V_5$, causing $V_2=0$ V, and therefore relay $SR_{803}$ is electrically connected. Because resistor $R_{809}$ is short-circuited when $V_2=0$ V before the contacts of relay $SR_{803}$ are closed, resistors $R_{809}$ and $R_{810}$ are connected in parallel, causing $V_6$ to drop its potential to a half level. In order to prevent the potential of $V_6$ from being doubled to cause relay $SR_{803}$ to be alternatively closed and opened due to voltage multiplication rectification after relay $SR_{803}$ is closed, the aforesaid design is provided to keep the potential of $V_6$ unchanged after relay $SR_{803}$ has been electrically connected, ie., $$V_6 = \sqrt{2} \times V_{AC} \times \frac{R_{810} // R_{810}}{R_{809} + R_{810} + R_{812} + R_{813}} \times 2$$

Because $V_{AC}=110$ V, resistor $R_{809}=100$ K, $V_6=3.89$ V~2.49 V, $V_6<V_7$, and $SR_{803}$ is remained unchanged. At this time, transistor $Q_{801}$ is off, relay $SR_{801}$ does no work, and inductor $T_{802}$ is connected in parallel.

(II) $V_{AC}=220$ V, resulting in $V_6=6.48\pm1.30$ V=7.78 V~5.18 V; in which case $V_6>V_7$, $V_1$ remains unchanged, i.e., $V_1=0$ V. Because $V_4=V_1=6$ V, and $V_6=V_7=4.17$ V, so that $V_4<V_5$, the output of comparator BCD is 12.5 V, and relay $SR_{803}$ does no work. At this time, transistor $Q_{801}$ is turned on, relay $SR_{801}$ works, and inductor $T_{802}$ is changed to series connection.

(c) Power supply voltage input is unstable:

The power supply voltages are ideally 110 V or 220 V. However, the power supply voltage maybe within 132 V~176 V when the power supply system falls, in which case:

(I) when the power supply voltage rises from 88 V to over 132 V (but below 176 V), 2-times double voltage rectification control is adopted, and the inductor is connected in parallel.

(II) when the power supply voltage drops from 264 V to 176 V (above 132 V), 1-time double voltage rectification control is adopted, and the inductor is connected in series.

It can been seen that the overlapped part above 132 V and below 176 V must thus be controlled by means of the comparator's hysteresis characteristic, i. e., the voltage range of the overlapped part becomes greater when the value of resistor $R_{808}$ is reduced, and vice versa. Further, because resistor $R_{809}$ is affected by diode $D_{803}$, the hysteresis characteristic is provided only at one side, and it is effective only when the voltage is increased from 132 V. According to the measuring result from the circuit shown in FIG. 12a, a 2-times double voltage rectification control and inductor connected in parallel result when voltage is increased from 88 V to 194 V, or a 1-time double voltage rectification control and inductor connected in series result when voltage drops from 264 V to 148 V.

It is to be understood that the drawings are designed for purposes of illustration only, and are not intended as a definition of the limits and scope of the invention disclosed.

What is claimed is:

1. A computer monitor power supply system for use in a 110 V and 220 V power supply to eliminate harmonics, comprising:

a flyback type power supply circuit which provides 110 V and 220 V power supplied by the power supply through an AC power supply input end to the computer monitor;

an inductor having first and second windings, each of said windings having a first end and a second end, said inductor being connected in series between said AC power supply input end and said flyback type power supply circuit, wherein an input terminal of said inductor is connected to the AC power supply input end and an output terminal of said inductor is connected to the flyback type power supply circuit;

a relay controlled to switch the windings of said inductor between a series connection in which the first end of the first winding is connected to said input terminal, the second end of said first winding is connected to the first end of the second winding, and the second end of the second winding is connected to said output terminal and a parallel connection in which the first end of each of said first and second windings is connected to said input terminal and the second end of each of said first and second windings is connected to said output terminal;

a comparator which detects a voltage level of the input power supply by means of a comparison, and controls said relay subject to the detected voltage level;

wherein said comparator controls said relay by causing said relay to change the windings of said inductor to said series connection when said voltage level corresponds to a voltage level of a 220 V power supply and to said parallel connection when said detected voltage level corresponds to a voltage level of a 110 V power supply so as to change an inductance of said inductor thereby further reduce a harmonic current value induced by said flyback type power supply circuit.

* * * * *